United States Patent Office 2,912,398
Patented Nov. 10, 1959

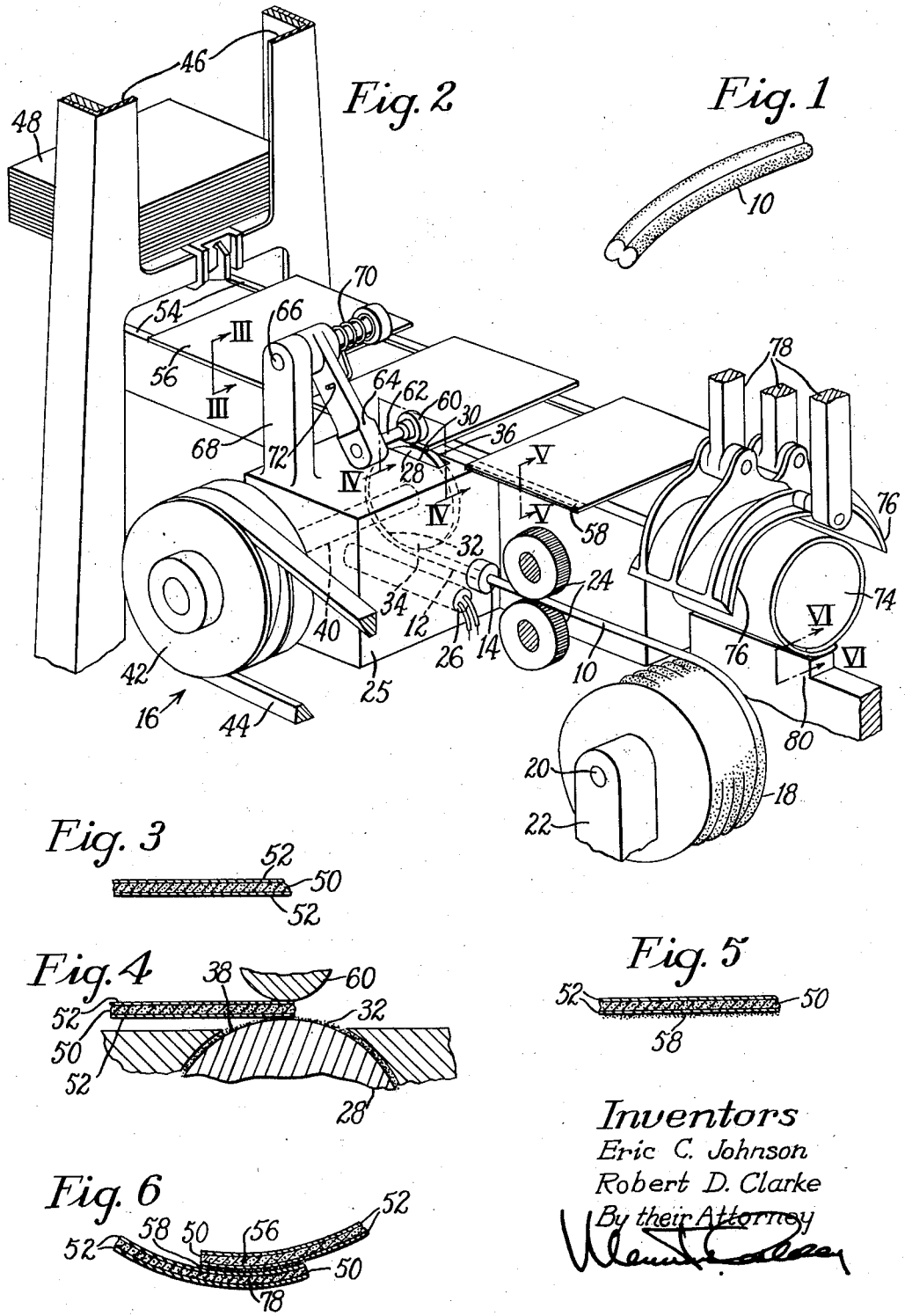

2,912,398

HEAT SOFTENABLE ADHESIVE SUPPLY BODIES

Eric C. Johnson and Robert D. Clarke, Somerville, Mass., assignors to B. B. Chemical Co., Boston, Mass., a corporation of Massachusetts Application October 21, 1957, Serial No. 691,384

9 Claims. (Cl. 260—23.5)

This invention relates to an article for supplying heat softened material and particularly to thermoplastic rod adhesives adapted for bonding metallic sheet material.

In the copending application entitled "Supply Bodies and Methods for Softening and Dispensing Heat Softenable Mixtures," Serial No. 539,770, filed October 11, 1955, in the name of Eric C. Johnson, one of the present inventors, there is disclosed an adhesive in the form of an elongated body or rod useful in direct through feed cementing systems for forming bonds between metal sheets or metal foil coated fiber sheets. The adhesive rod is formed of a heat softenable intimate mixture of a polyepoxide resin and a thermoplastic carrier nonreactive with the polyepoxide resin. The preferred thermoplastic carrier as disclosed in that application is a mixture of a rubbery polymer, polyethylene, and a hydrocarbon resin having at elevated temperature at least limited solvent power toward the polyethylene.

It is a feature of the present invention to provide an improved adhesive article possessing particularly desirable flow characteristics in heated condition coupled with improved ability to wet and form a strong bond to metal surfaces.

The rod or supply body of the present invention is a heat softenable combination of reacted components including a polyamide resin and a polyepoxide resin together with a thermoplastic carrier. In the preferred form the composition includes a phenol which acts on the polyepoxide resin to reduce its freedom to react with the polyamide resin to form gelling polyamide epoxy reaction products at the relatively high temperature reached during application. At the same time the phenol provides additional hydroxyl groups which make the composition more polar and improves the wetting out and bonding of metallic surfaces. Other interactions between the components may be involved and contribute to the superior action of the composition. The rod or supply body is useful to supply thermoplastic material for adhesives, coatings and the like particularly where bonding to metal is involved.

The invention will be described further in connection with the drawings forming part of the disclosure, in which, Fig. 1 is an angular view of a portion of a rod or supply body composed of a heat softenable intimate mixture of materials according to the present invention;

Fig. 2 is a partial angular view of a container-forming device for practicing the method of the present invention in forming and bonding containers with an adhesive rod;

Fig. 3 is a cross sectional view on a somewhat enlarged scale taken on the line III—III of Fig. 2 showing metal foil coated fiber sheet material for forming into the containers using a rod adhesive according to the present invention;

Fig. 4 is a sectional elevational view with parts broken away and on a somewhat enlarged scale taken on the line IV—IV of Fig. 2 and showing the application of adhesive to a metal foil coated sheet;

Fig. 5 is a sectional view taken on the line V—V of Fig. 2 and on a somewhat enlarged scale showing a metal foil coated sheet carrying adhesive deposited on the foil; and Fig. 6 is a somewhat enlarged sectional view taken on the line VI—VI of Fig. 2 and showing the adhesive joint between overlapped portions of a metal foil coated fiber sheet container.

As explained more fully in the copending application of Thomas C. Morris and Eric C. Johnson (one of the present inventors), entitled "Thermoplastic Adhesive Rods or Strips," Serial No. 377,162, filed August 28, 1953, direct through feed adhesive dispensing is a system wherein an elongated self-supporting body or rod 10 of solid thermoplastic adhesive having a substantially uniform cross section and special "brittle point" and dimensional stability characteristics is fed into a heating zone, e.g. a heated softening and dispensing passageway 12 of which the cross section of the entrance 14 is complementary to the cross section of the adhesive rod. Forward portions of the adhesive rod are softened or melted in the passageway to bring the adhesive to condition for application to a surface to be bonded. Following portions of the rod bear uniformly against the full cross section of adhesive in the passageway to provide a sweeping action and both the softened and unsoftened portions of the adhesive move in orderly fashion through the passageway.

The adhesive or heat softenable composition of the present invention involves a substantially non-reactive thermoplastic carrier and the combination in special ranges of relative proportions of a polyamide resin, a polyepoxide resin and, desirably, a phenol. It is known (see the copending application of Thomas C. Morris and Eric C. Johnson, one of the present inventors, Serial No. 377,162, filed August 28, 1953) that polyamide resin may be combined with a minor amount of polyepoxide resin to form a stable thermoplastic product possessing desirable flow characteristics coupled with toughness and strength in solid condition. In the present composition where phenol is included a substantially higher relative proportion of polyepoxide resin to polyamide resin may be present in the combination without gelling or curing the polyamide. Thus the polyepoxide and polyamide resin may be present in the relative molar proportions of from 80:20 to 20:80 without gelling. The compositions include a high percentage of polyamide to give desirable flow characteristics and desirable bonding and holding characteristics and also include a high percentage of polyepoxide which gives superior metal bonding characteristics without gelling the polyamide.

The combination of polyamide, polyepoxide and phenol is reducible to a stiff but flexible, non-brittle rod by combination with substantially nonreactive thermoplastic resinous carriers, particularly mixtures of polyethylene, polymeric butylene materials and hydrocarbon resins possessing in heated condition substantial ability to dissolve polyethylene. In the entire combination the polymeric butylene material helps both adhesion and flexibility and the hydrocarbon resin helps adhesion and also serves as a flux to bring together and combine the desirable properties of the polyethylene and polymeric butylene material. The phenol, which operates to reduce gelling tendencies of the polyamide and polyepoxide components, also protects the polyethylene and other components against undesired oxidation and deterioration on storage, during application and in the bond formed from the composition.

The combined weight of polyethylene and polyamide in the composition is preferably not over about 60% to insure desirable setting up behavior or open time, e.g. one foot open time in bonding at a rate of 200 to 250 feet per minute of bonded seam. Likewise, the combined weight of epoxy and polyamide in the combination should be from about 10% to about 30% by weight of the composition in order that the flexibility and freedom from brittleness of the composition may be kept at desirable levels.

The polyamide is a resinous material formed by reaction of polymerized polyene fat acids or their amide forming derivatives such as their monohydric alcohol esters or their anhydrides or acyl halides with an organic aliphatic compound possessing at least two primary amino groups. The polymeric fat acids may be those formed for example by thermal polymerization of drying or semi-drying type fatty oils containing glycerides of polymerizable fat acids such as soybean oil, linseed oil, cottonseed oil, perilla oil, dehydrated castor oil and the like. The polymeric glyceride may then be isolated as by distillation and converted to polymeric fat acid by hydrolysis.

The polymerized fat acids or their amide forming derivatives are combined with preferably equimolecular amounts of amino compounds such as ethylene diamine, diethylene triamine, hexamethylene diamine, tetraethylene pentamine or other alkylene polyamines, or mixtures of these with each other or with related compounds such as monoethanolamine. The combination reaction is brought about by heating the mixed materials at such a temperature that polyaminolysis of the fat esters or dehydration of the polyamine salts of the fat acids will occur readily. Temperatures of 150–175° C. for a few hours and 175°–225° C. for 20 to 40 minutes just prior to removal of polyamide from the reaction chamber are sufficient. Details of this resin forming process may be found in U.S. Patent to Cowan et al. 2,450,940 of October 12, 1948. Desirable polyamide resins are those having low amine values (expressed in mg. KOH equivalent to 1 gm. of resin), preferably in the range of from 1 to 4 and softening points in the range of from 60° C. to 150° C.

A variety of polyepoxide resins may be used in combination with the phenol and polyamide resin. These polyepoxide resins are usually glycidyl polyethers of a polyhydric phenol, a polyhydric alcohol or both. The polyepoxides are complex resinous materials and may be produced by the reaction of polyhydric phenols with a polyfunctional chlorhydrin such as epichlorhydrin and glycerol dichlorhydrin. The chlorhydrin is employed in proportion in excess of a molecular equivalent of the polyhydric phenolic material and may be employed in amount up to twice the equivalent of the phenolic material, for example 2 mols of epichlorhydrin may be reacted with one mol of diphenylol propane in the presence of caustic alkali in excess of the amount required to combine with the halogen of the epichlorhydrin. On heating to about 100° C. there is formed a resinous complex polymeric material containing both terminal epoxy groups and terminal primary hydroxyl groups. Polyhydric phenols for use in forming these resins include in addition to diphenylol propane such polyhydric phenol materials as bis phenol, hydroquinone, resorcinol and others. Complex epoxides useful for reaction with phenols and polyamides may also be made by reacting polyhydric phenols with simpler polyepoxides to give complex polyepoxides. For example, glycerin or trimethylol propane may be reacted with epichlorhydrin to give a simple polyepoxide which may then be reacted with dihydric phenols to form useful complex polyepoxide resins. The preparation of epoxide resins is shown in United States Patents Nos. 2,506,486 to Bender et al., issued May 2, 1950, and 2,589,245 to Greenlee, issued March 18, 1952.

It has been observed that the polyamide resin and epoxy resin react only to a limited extent when heated together at temperatures not greatly above their fusion points, for example at 150° C. involved in the usual course of manufacture. At higher temperatures, for example at about 200° C. or above, at which the adhesive is usually applied, epoxy resin and polyamide resin will react further and gel in a relatively short time. This gelling, which interferes with use of the composition, is retarded or prevented by incorporation of the phenol in the composition. The hydroxyl group of the phenol reacts with the polyepoxide at the relatively lower temperature of compounding the mixture to bind or at least to mask the epoxy groups. These bound or masked epoxy groups reduce the effective epoxide concentration so that at the high temperature of application the epoxide groups are hindered or prevented from reaction with polyamide to cause gelling.

To achieve desirable delay of gelation it appears that at least about 50% of the amount of phenol required to react stoichiometrically with the epoxide groups should be used. Amounts of phenol greatly in excess of this may be used. For example, in one formulation as much as 10 times the stoichiometric amount has been used with no difficulty. Phenols in general are useful. A phenol preferred because of its excellent antioxidant action and its compatibility with the remaining components is 2,6-t-butyl,4-methyl phenol.

As illustrating the action of the phenol, 104 grams of a polyamide having an amine number of 3, a softening point in the range of 105° to 115° C. (ASTM E28–51T), and a viscosity at 150° C. of 30 to 45 poises on a Brookfield viscometer were melted. When the temperature of the polyamide reached 150° C., 69 grams of an epoxide resin having a melting point in the range of 95° to 105° C. and an epoxide equivalent of from 870 to 1,025 were added and the mixture was agitated rapidly for 10 minutes. At the end of this time the temperature of the mixture was raised rapidly and gelation occurred in 24 minutes and 10 seconds, at the end of which time the temperature had reached 224° C. The procedure was repeated except that 16 grams of 2,6-t-butyl 4-methyl phenol were added at the end of the 10 minute mixing period and before the temperature was raised. In this case gelation did not occur until the end of a period of 32 minutes and 47 seconds, at the end of which time the temperature was 223° C. The procedure was repeated except that 16 grams of 90% phenol were added in place of the 2,6-t-butyl,4-methyl phenol at the end of the 10 minute mixing period. Gelation did not occur until at the end of a period of 31 minutes and 57 seconds, at the end of which time the temperature was 210° C. The results indicate a delay of 40% to 50% in the occurrence of gelation through the addition of the phenol.

The preferred thermoplastic carrier or base is a mixture of from about 15% to about 60% by weight of polyethylene, from about 10% to about 35% by weight of a high molecular weight rubbery polymeric material and from about 20% to about 60% by weight of a hydrocarbon resin having at least limited solvent action in molten condition toward the polyethylene. Relatively high molecular weight polyethylene materials are desirable, such as those having molecular weights in the ranges of from about 7,000 to about 21,000 as determined by viscometric means using a solution of the polyethylene in tetralin at 130° C. and calculating molecular weight by the following equation:

$$M = \frac{K_{cm} \log_{10} \eta_r}{C}$$

where M equals average molecular weight, $\eta_r$ equals relative viscosity, C equals base molar concentration of polymer in tetralin at temperature of determination (equals 4.0 gms. per liter at 130° C.) and $K_{cm}$ equals $4.03 \times 10^{-4}$ gms. per liter of solution at 130° C.; however lower molecular weight polyethylenes may be used along with the high molecular weight polyethylenes to reduce the softening point and to vary the flow and other characteristics of the adhesive. The polyethylene material contributes strength and sharp melting and sharp setting up characteristics which are important to bonding at commercially acceptable speeds.

The preferred class of hydrocarbon resin having useful solvent action in molten condition toward the polyethylene is the polyterpene resins, particularly beta pinene polymers such as those sold under the trademark "Piccolyte." These polymeric materials are made in a wide range of melting points, the preferred polymers being those having melting points of from 85° to 125° C. Other hydrocarbon resins possessing a similar action in molten condition include resinous polymerization products obtained by catalytic polymerization of mixed unsaturated monomers derived from cracked petroleum, including the commercially available materials known as Piccopale, which is the resinous polymerization product obtained by catalytic polymerization of a mixture of unsaturated monomers having a molecular weight approximately 90 composed essentially of dienes and reactive olefins derived from deep cracking petroleum and having a softening point (BR) of approximately 100° C., a specific gravity at 25° C. of .970 to .975, a refractive index at 20° C. of 1.5116, an acid number less than 1, an iodine value (Wijs) of 120, a bromine number of 7.3 and a molecular weight of approximately 1100, and Kenflex A and fossil resinous materials such as the commercial material known as RBH 510 which is understood to be a resin separated from Utah type resin-bearing coal which consists essentially of carbon and hydrogen, has an average molecular weight of about 1,000, a refractive index of 1.544, a specific gravity of from 1.03 to 1.06, and a melting point of from 165° to 180° C., and the commercial material known as Solarite #64 which consists essentially of carbon and hydrogen, has an acid number of 2, a specific gravity of 1.01 to 1.02, and a melting point of 195° to 205° C.

Rubbery polymeric materials which have been found useful to perform the above-mentioned functions include a high molecular weight rubbery polyisobutylene, i.e. a material having a molecular weight of the order of about 100,000 or may be the material known as "butyl rubber," that is, a sulfur vulcanizable rubbery copolymer of isobutylene and a diolefin, usually isoprene or butadiene, in approximately the proportions of 98 parts isobutylene to two parts of the diolefin. Rubbery copolymers of butadiene and acrylonitrile containing up to 35% of acrylonitrile may also be used.

Use of the thermoplastic rod adhesive for bonding metal foil coated fiber sheet material will be described in connection with the cylindrical container making device 16 shown in Fig. 2. It will be understood that the rod is useful for other bonding operations. The device of Fig. 2 shows a thermoplastic adhesive softening and dispensing system associated with conventional feeding and forming mechanism. A reel 18 of thermoplastic rod adhesive is placed on the shaft 20 carried by the standard 22. Rod adhesive 10 unwound from the reel 18 passes through opposed knurled feeding rolls 24 to which power may be supplied to feed the rod as needed into the entrance port 14 of the melting and applying section of the system. The rod 10 passes from the entrance port 14 of a heating zone including a channel 12 in a metal body 25 where it is softened and reduced to fluid condition by heat supplied by the electrical heating cartridge 26. As the rod 10 moves through the channel 12 it softens progressively and becomes fluid from the outer portions inward; but since the cross sectional areas throughout the length of the channel are not substantially greater than that of the rod, both unsoftened and softened portions of the rod adhesive move forward at approximately the same rate and the intimate mixture of components is maintained. An applying wheel 28 is mounted in a snugly fitting recess 30 in position such that portions of its edge 32 form a side of the channel 12 and its side faces 34 are in heat exchange relation with the metal body 25. As will be observed from the drawing the edge 32 of the applying wheel 28 and the opposite wall of the channel 12 come closer together towards the upper portion of the wheel so that the channel defined between them becomes progressively smaller in cross section. Also, a portion 36 of the wheel 28 projects from the opening 30 in the top of the body for adhesive transfer engagement with articles to be bonded. The position of the wheel 28 may be so fixed with respect to the walls of the channel 12 as to limit to a predetermined thickness the layer 38 of adhesive carried up through the opening 30 by the edge 32 of the applying wheel 28, or an adjustable doctor blade (not shown) may be provided to control the thickness of adhesive carried by the applying wheel. The applying wheel 28 is mounted on a shaft 40 which is driven by a pulley 42 and belt 44. Since the applying wheel 28 is heated by contact with the walls of the block 25 in which it is mounted, it assists in completing the melting and in bringing rod adhesive in the channel to the desired ultimate temperature. The wheel 28 also carries a layer 38 of fluid adhesive of controlled thickness and transfers this adhesive to articles brought in contact with it. Also, because of the heat it carries it may have some effect in insuring completeness of union of the adhesive with a surface brought in contact with it.

The container forming device 16 with which the adhesive supplying system is employed comprises guides 46 in which are deposited blanks 48 to be formed in the device. As shown in Fig. 3, these blanks may be formed of a core 50 of fiberboard or pasteboard or similar sheet material having metal foil sheets 52, for example aluminum foil, joined on its faces. Union of the fiberboard to the metal foil is not a part of the present invention but it is understood that the metal foil is secured to the fiberboard by means of polyvinyl acetate. Blanks 48 are slipped from the bottom of the pile to the slideways 54 and are moved along the slideways by means of conventional feeding mechanism, for example a dog type feed. As illustrated, these blanks 48 are moved so that one edge 56 passes over the exposed portion 36 of the applying wheel 28 for deposition thereon of a band 58 of the fluid thermoplastic rod adhesive. A presser roll 60 for holding a blank 48 in firm contact with the applying wheel 28 is rotatably mounted on a shaft 62 which is carried at the end of an arm 64 rotatably mounted on a shaft 66 carried by the standard 68. Pressure on the wheel 60 to force the blank into contact with the applying wheel may be supplied by the weight of the wheel and arm or as shown may be supplemented by a spring 70, suitably a coil spring such as that shown in Fig. 2, which is wound around the shaft 66 to which it is fixed at one end, the other end projecting out and being passed through an opening 72 in the arm 64. The transfer of adhesive from the applying wheel 28 to the blank 48 and the action of the wheel 60 in holding the blank against the applying wheel are shown in Fig. 4. The ribbon or band 58 of adhesive carried by the blank 48 after it leaves the applying wheel 28 is shown in Fig. 5. The blank 48 with ribbon 58 of hot fluid adhesive thereon is moved to position above the forming horn 74 and is bent around the horn by the reciprocating forming wings 76 which are carried and caused to function by the supporting arms which are actuated by suitable mechanism (not shown). When the blank 48 has been formed around the horn, with the edges 56 and 78 overlapping, the bumping bar 80 is moved to the position shown in Fig. 2 to press the cemented edge portion 56 of the blank 48 against the opposite edge portion 78 of the blank to establish a bond between them. The formed and bonded cylindrical container body is then pushed off of the horn 74 and the cycle is repeated.

The following examples are given to aid in understanding the invention. It is to be understood that the invention is not restricted to materials, proportions, or conditions recited in the examples:

Example I

| | Parts by weight |
|---|---|
| Polyethylene (molecular weight 12,000) | 34.3 |
| B-pinene polymer resin (melting point 115° C.) | 26.5 |
| Copolymer of about 98 parts isobutylene and 2 parts isoprene | 19.6 |
| Polyamide resin (amine number 1.3, softening point 105° to 115° C., viscosity at 150° of 15 to 30 poises) | 7 |
| Epoxy resin (melting point 95° to 105° C., epoxide equivalent 870 to 1,025) | 10.6 |
| 2,6-t-butyl,4-methyl phenol | 2 |

The B-pinene polymer resin was introduced into a WP mixer and the temperature raised to about 165° C. using 100 lbs. steam in the jacket of the vessel. The copolymer material was then added and mixed in and the temperature lowered to about 125° to 130° C.

The polyamide resin was introduced into a heated vessel provided with an agitator and brought to a temperature of 150° C. Thereafter the epoxide resin was added and the mixture heated with agitation for 10 minutes to effect fluxing or uniform mixture. The fluxed polyamide epoxy material was added to the mixture of poly B-pinene and copolymer in the WP mixer and mixed in. Thereafter the phenolic material was added and finally the polyethylene was added and mixed in. The mixture was extruded as a ¼" rod, the extrusion temperature being maintained at about 200° F.

This material was applied at 400° F. in a direct through feed dispensing and applying system as described in this specification for the bonding of aluminum foil coated fiber board containers and formed a strong bond between joined surfaces.

Example II

| | Parts by weight |
|---|---|
| Polyethylene (molecular weight 12,000) | 34.3 |
| B-pinene polymer resin (melting point 115° C.) | 26.5 |
| Copolymer of about 98 parts isobutylene and 2 parts isoprene | 19.6 |
| Polyamide resin (amine number 1.3, softening point 105° to 115° C., viscosity at 150° of 15 to 30 poises) | 10.6 |
| Epoxy resin (melting point 95° to 105° C., epoxide equivalent 870 to 1,025) | 7 |
| 2,6-t-butyl,4-methyl phenol | 2 |

The adhesive was mixed and extruded as a rod in accordance with the procedure outlined in Example I.

The adhesive rod was useful for the bonding of aluminum foil covered fiber board laminates and formed a strong waterproof bond.

Example III

| | Parts by weight |
|---|---|
| Polyethylene (molecular weight 21,000) | 25.7 |
| Polyethylene (molecular weight 12,000) | 8.6 |
| Polyisobutylene (molecular weight 64,000 to 81,000) | 19.6 |
| B-pinene polymer (softening point 115° C.) | 26.5 |
| Polyamide resin (amine number 1.3, softening point 105° to 115° C., viscosity at 150° of 15 to 30 poises) | 10.6 |
| Epoxy resin (melting point 64° to 76° C., epoxide equivalent 450 to 525) | 7 |
| 2,6-t-butyl,4-methyl phenol | 2 |

The composition was mixed in accordance with essentially the same procedure used in Example I, the polyisobutylene being introduced at the point of the procedure at which the copolymer material of Example I was introduced. The portion of the polyethylene having a molecular weight of 21,000 was introduced after addition of the polyamide epoxide material and finally the polyethylene of molecular weight 12,000 was introduced. The mixture was extruded at a temperature of 200° C.

The extruded rod was used in a direct through feed dispensing and applying system at a temperature of 400° C. for the bonding of aluminum foil.

Example IV

| | Parts by weight |
|---|---|
| Polyethylene (molecular weight 12,000) | 36 |
| Butadiene-acrylonitrile copolymer (35% acrylonitrile) | 14.5 |
| B-pinene polymer (melting point 125° C.) | 25.7 |
| Polyamide resin (amine number 1.3, softening point 105° to 115° C., viscosity at 150° of 15 to 30 poises) | 13.2 |
| Epoxy resin (melting point 95° to 105° C., epoxide equivalent 870 to 1,025) | 8.72 |
| 2,6-t-butyl,4-methyl phenol | 1.94 |

This material was mixed according to the same procedure described in Example I, the butadiene-acrylonitrile copolymer being introduced at the same point as was the isobutylene-isoprene copolymer of Example I. The composition was extruded at 200° C.; and the extruded rod was applied in a direct through feed dispensing and applying system as described in this specification at a temperature of 400° C. for bonding aluminum foil covered cardboard.

Example V

| | Parts by weight |
|---|---|
| Polyethylene (molecular weight 12,000) | 30 |
| Copolymer of about 98 parts isobutylene and 2 parts isoprene | 14.7 |
| Bi-pinene polymer (softening point 125° C.) | 26.5 |
| Polyamide resin (amine number 1.3, softening point 105° to 115° C., viscosity at 150° of 15 to 30 poises) | 16.1 |
| Epoxy resin (melting point 95° to 105° C., epoxide equivalent 450 to 525) | 10.7 |
| 2,6-t-butyl,4-methyl phenol | 2 |

This composition was prepared according to the procedure of Example I and extruded as a flexible rod at a temperature of 205°.

The composition was applied in a direct through feed dispensing and applying system at a temperature of 400° C. for bonding aluminum foil covered cardboard.

Example VI

| | Parts by weight |
|---|---|
| Polyethylene (molecular weight 12,000) | 39.9 |
| Copolymer of about 98 parts isobutylene and 2 parts isoprene | 8.8 |
| B-pinene polymer resin (melting point 125° C.) | 29.8 |
| Polyamide resin (amine number 1.3, softening point 105° to 115° C., viscosity at 150° of 15 to 30 poises) | 11.9 |
| Epoxy resin (melting point 40° to 45° C., epoxide equivalent 300 to 375) | 8 |
| 2,6-t-butyl,4-methyl phenol | 1.8 |

This composition was mixed according to the procedure described in Example I and extruded as a ¼" thickness flexible rod at a temperature of 210° C.

The rod was used for the bonding of aluminum foil to itself employing a direct through feed dispensing and applying system at a temperature of 400° C.

Having thus described our invention, what we claim as new and desire to secure by Letters Patent of the United States is:

1. As a new article of manufacture, a slender, flexible, self-supporting rod of solid adhesive comprising the heat softenable mixture of a thermoplastic base comprising from 15% to 60% by weight of polyethylene having a molecular weight of from about 7,000 to about 21,000, from 10% to 35% by weight of high molecular weight compatible rubbery polymeric material from the group consisting of polyisobutylene having a molecular weight of the order of about 100,000, sulphur vulcanizable copolymers of isobutylene and a diolefin in approximately the proportions of 98:2, and copolymers of butadiene and acrylonitrile containing up to 35% of acrylonitrile and from 20% to 60% by weight of an essentially hydrocarbon resin possessing in heated condition at least limited solvent power toward said polyethylene, said resin being selected from the group consisting of poly beta-pinene resins having a softening point of from 85° to 125° C., the resin separated from Utah type resin-bearing coal which consists essentially of carbon and hydrogen, has an average molecular weight of about 1,000, a refractive index of 1.544, a specific gravity of from 1.03 to 1.06 and a melting point of from 165° to 180° C., and the resinous polymerization product obtained by catalytic polymerization of a mixture of unsaturated monomers derived from deep cracking petroleum and having a softening point (BR) of approximately 100° C., a specific gravity at 25° C. of .970 to .975, a refractive index at 20° C. of 1.5116, an acid number less than 1, an iodine value (Wijs) of 120, a bromine number of 7.3 and a molecular weight of approximately 1100, from 10% to 30% by weight of the mixture of a heat softenable combination of a resinous polyamide of a polymeric polyene fat acid and a resinous glycidyl polyether, said resinous glycidyl polyether and resinous polyamide being present in said combination in the relative molar proportions of from 80:20 to 20:80, and at least about 50% of the quantity of a monohydric phenol required for stoichiometric reaction with the epoxide groups of said polyether.

2. As a new article of manufacture, a slender, flexible, self-supporting rod of solid adhesive comprising the heat softenable mixture of a thermoplastic base comprising from 15% to 60% by weight of polyethylene having a molecular weight of from about 7,000 to about 21,000, from 10% to 35% by weight of a high molecular weight compatible rubbery polymeric material from the class consisting of polyisobutylene having a molecular weight of the order of about 100,000, sulfur vulcanizable rubbery copolymers of 98 parts isobutylene and 2 parts of a diolefin and copolymers of butadiene and acrylonitrile containing up to 35% of acrylonitrile, and from 20% to 60% by weight of an essentially hydrocarbon resin possessing in heated condition at least limited solvent power toward said polyethylene, said hydrocarbon resin being selected from the group consisting of poly beta-pinene resins having a softening point of from 85° to 125° C., the resin separated from Utah type resin-bearing coal which consists essentially of carbon and hydrogen, has an average molecular weight of about 1,000, a refractive index of 1.544, a specific gravity of from 1.03 to 1.06 and a melting point of from 165° to 180° C., and the resinous polymerization product obtained by catalytic polymerization of a mixture of unsaturated monomers derived from deep cracking petroleum and having a softening point (BR) of approximately 100° C., a specific gravity at 25° C. of .970 to .975, a refractive index at 20° C. of 1.5116, an acid number less than 1, an iodine value (Wijs) of 120, a bromine number of 7.3 and a molecular weight of approximately 1100, from 10% to 30% by weight of the mixture of the product of fluxing together at a temperature and for a time less than those which cause gelling reaction a resinous polyamide of a polymeric polyene fat acid, said polyamide having an amine number of from 1 to 4, and a resinous glycidyl polyether of a member of the group consisting of polyhydric phenols, polyhydric alcohols and mixtures of these, said resinous glycidyl polyether and resinous polyamide being present in said combination in the relative molar proportions of from 80:20 to 20:80, and at least about 50% of the quantity of a monohydric phenol required for stoichiometric reaction with the epoxide groups of said polyether.

3. As a new article of manufacture, a slender, flexible, self-supporting rod of solid adhesive comprising the heat softenable mixture of a thermoplastic base comprising from 15% to 60% by weight of polyethylene having a molecular weight of from about 7,000 to about 21,000, from 10% to 35% by weight of a high molecular weight sulfur vulcanizable rubbery copolymer of 98 parts isobutylene and 2 parts of a diolefin and from 20% to 60% by weight of a beta-pinene polymer resin having a softening point of from about 85° C. to about 125° C., from 10% to 30% by weight of the mixture of the product of fluxing together at a temperature and for a time less than those which cause gelling reaction a resinous polyamide of a polymeric polyene fat acid, said polyamide having an amine number of from 1 to 4, and a resinous glycidyl polyether of a polyhydric phenol, said resinous glycidyl polyether and resinous polyamide being present in the relative molar proportions of from 80:20 to 20:80, and at least about 50% of the quantity of a monohydric phenol required for stoichiometric reaction with the epoxide groups of said polyether.

4. As a new article of manufacture, a slender, flexible, self-supporting rod of solid adhesive comprising the heat softenable mixture of a thermoplastic base comprising from 15% to 60% by weight of polyethylene having a molecular weight of from about 7,000 to about 21,000, from 10% to 35% by weight of a high molecular weight sulfur vulcanizable rubbery copolymer of 98 parts isobutylene and 2 parts of a diolefin and from 20% to 60% by weight of the resin separated from Utah resin-bearing coal which consists essentially of carbon and hydrogen, has an average molecular weight of about 1,000, a refractive index of 1.544, a specific gravity of from 1.03 to 1.06 and a melting point of from 165° to 180° C., from 10% to 30% by weight of the mixture of the product of fluxing together at a temperature and for a time less than those which cause gelling reaction a resinous polyamide of a polymeric polyene fat acid, said polyamide having an amine number of from 1 to 4 and a resinous glycidyl polyether of a polyhydric phenol, said resinous glycidyl polyether and resinous polyamide being present in the relative molar proportions of from 80:20 to 20:80, and at least about 50% of the quantity of a monohydric phenol required for stoichiometric reaction with the epoxide groups of said polyether.

5. As a new article of manufacture, a slender, flexible, self-supporting rod of solid adhesive comprising the heat softenable mixture of a thermoplastic base comprising from 15% to 60% by weight of polyethylene having a molecular weight of from about 7,000 to about 21,000, from 10% to 35% by weight of a high molecular weight sulfur vulcanizable rubbery copolymer of 98 parts isobutylene and 2 parts of a diolefin and from 20% to 60% by weight of the resinous polymerization product obtained by catalytic polymerization of a mixture of unsaturated monomers derived from deep cracking petroleum having a softening point (BR) of approximately 100° C., a specific gravity at 25° C. of .970 to .975, a refractive index at 20° C. of 1.5116, an acid number less than 1, an iodine value (Wijs) of 120, a bromine number of 7.3 and a molecular weight of approximately 1100, from 10% to 30% by weight of the mixture of the product of fluxing together at a temperature and for a time less than those which cause gelling reaction a resinous polyamide of a polymeric polyene fat acid, said polyamide having an amine number of from 1 to 4 and a resinous glycidyl polyether of a polyhydric phenol, said resinous glycidyl polyether and resinous polyamide being present in the relative molar proportions of from 80:20 to 20:80, and at least about 50% of the quantity of a monohydric phenol required for stoichiometric reaction with the epoxide groups of said polyether.

6. As a new article of manufacture, a slender, flexible, self-supporting rod of solid adhesive comprising the heat softenable mixture of a thermoplastic base comprising from 15% to 60% by weight of polyethylene having a molecular weight of from about 7,000 to about 21,000, from 10% to 35% by weight of a high molecular weight polyisobutylene having a molecular weight of the order of about 100,000, and from 20% to 60% by weight of a beta-pinene polymer resin having a softening point of from about 85° C. to about 125° C., from 10% to 30% by weight of the mixture of the product of fluxing together at a temperature and for a time less than those which cause gelling reaction a resinous polyamide of a polymeric polyene fat acid, said polyamide having an amine number of from 1 to 4 and a resinous glycidyl polyether of a polyhydric phenol, said resinous glycidyl polyether and resinous polyamide being present in the relative molar proportions of from 80:20 to 20:80, and at least about 50% of the quantity of a monohydric phenol required for stoichiometric reaction with the epoxide groups of said polyether.

7. As a new article of manufacture, a slender, flexible, self-supporting rod of solid adhesive comprising the heat softenable mixture of a thermoplastic base comprising from 15% to 60% by weight of polyethylene having a molecular weight of from about 7,000 to about 21,000, from 10% to 35% by weight of a high molecular weight copolymer of butadiene and acrylonitrile containing up to 35% of acrylonitrile, and from 20% to 60% by weight of a beta-pinene polymer resin having a softening point of from about 85° C. to about 125° C., from 10% to 30% by weight of the mixture of the product of fluxing together at a temperature and for a time less than those which cause gelling reaction a resinous polyamide of a polymeric polyene fat acid, said polyamide having an amine number of from 1 to 4 and a resinous glycidyl polyether of a polyhydric phenol, said resinous glycidyl polyether and resinous polyamide being present in the relative molar proportions of from 80:20 to 20:80, and at least about 50% of the quantity of a monohydric phenol required for stoichiometric reaction with the epoxide groups of said polyether.

8. As a new article of manufacture, a slender, flexible, self-supporting rod of solid adhesive comprising the heat softenable mixture of a thermoplastic base comprising from 15% to 60% by weight of polyethylene having a molecular weight of from about 7,000 to about 21,000, from 10% to 35% by weight of a high molecular weight sulful vulcanizable rubbery copolymer of 98 parts isobutylene and 2 parts of a diolefin and from 20% to 60% by weight of a B-pinene polymer resin having a softening point of from about 85° C. to about 125° C., from 10% to 30% by weight of the mixture of the product of fluxing together at a temperature and for a time less than those which cause gelling reaction a resinous polyamide of a polymeric polyene fat acid, said polyamide having an amine number of from 1 to 4 and a resinous glycidyl polyether of a polyhydric phenol, said resinous glycidyl polyether and resinous polyamide being present in the relative molar proportions of from 80:20 to 20:80, and at least about 50% of the quantity of a monohydric phenol required for stoichiometric reaction with the epoxide groups of said polyether.

9. As a new article of manufacture, a slender, flexible, self-supporting rod of solid adhesive comprising the heat softenable mixture of a thermoplastic base comprising from 15% to 60% by weight of polyethylene having a molecular weight of from about 7,000 to about 21,000, from 10% to 35% by weight of a high molecular weight polyisobutylene having a molecular weight of the order of about 100,000 and from 20% to 60% by weight of a B-pinene polymer resin having a softening point of from about 85° C. to about 125° C., from 10% to 30% by weight of the mixture of the product of fluxing together at a temperature and for a time less than those which cause gelling reaction, a resinous polyamide of a polymeric polyene fat acid, said polyamide having an amine number of from 1 to 4 and a resinous glycidyl polyether of a polyhydric phenol, said resinous glycidyl polyether and resinous polyamide being present in the relative molar proportions of from 80:20 to 20:80, and at least about 50% of the quantity of a monohydric phenol required for stoichiometric reaction with the epoxide groups of said polyether.

References Cited in the file of this patent

UNITED STATES PATENTS

| | | |
|---|---|---|
| 2,512,996 | Bixler | June 27, 1950 |
| 2,705,223 | Renfrew et al. | Mar. 29, 1955 |
| 2,772,247 | Schroeder | Nov. 27, 1956 |
| 2,798,833 | Lapsensohn et al. | July 9, 1957 |

OTHER REFERENCES

Noller: Textbook of Organic Chemistry, pages 564–7, W. B. Saunders Co. (1951). Copy in Scientific Library.

Modern Plastics, page 240, vol. 33, No. 4 (December 1955).